Patented Aug. 31, 1943

2,327,985

UNITED STATES PATENT OFFICE 2,327,985

ACYL ISOTHIOCYANATE AND POLYMER THEREOF

Van Vernon Alderman, Arden, and Donald Drake Coffman, Wilmington, Del., assignors to E. I. du Pont de Nemours & Company, Wilmington, Del., a corporation of Delaware No Drawing. Application March 29, 1940, Serial No. 326,786

10 Claims. (Cl. 260—80)

This invention relates to organic compounds, more particularly to acyl isothiocyanates, and still more particularly to alpha, beta-unsaturated acyl isothiocyanates and their polymers.

This invention has as an object the preparation of new monomeric acyl isothiocyanates. A further object is the preparation of new polymers, including simple polymers and copolymers. Another object is the preparation of materials useful in the preparation of N-substituted thioureas and thiourethanes. A further object is the preparation of materials useful in coating compositions, plastics, waterproofing agents and the like. Other objects will appear hereinafter.

These objects are accomplished by the following invention which comprises monomeric acyl isothiocyanates having an ethylenic double bond between the carbon alpha to the carbonyl group and that in the beta position, and polymers, both simple and copolymers, of the same, particularly copolymers with polymerizable organic compounds containing a methylene ($CH_2$) group attached by an ethylenic double bond to a carbon atom which is in turn attached to at least one negative group.

The monomeric acyl isothiocyanates of the present invention are represented by the formula

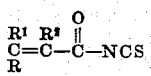

wherein R, $R^1$, $R^2$ are hydrogen or monovalent organic radicals free from any group reactive with the isocyanate group and more particularly free from groups possessing an active hydrogen as determined by the Zerewitinoff method. R, $R^1$ and $R^2$ may therefore be hydrogen, halogen, aryl, aralkyl, aromatic heterocyclic, aliphatic heterocyclic, alicyclic, aliphatic, alkoxy, aralkoxy, aryloxy, etc. For convenience, availability of initial materials, and ease of preparation, the wholly aliphatic acyl isocyanates, i. e., those wherein R, $R^1$ and $R^2$ are hydrogen or monovalent aliphatic radicals are greatly preferred. Groups reactive with the isothiocyanate group and therefore not to be present in R, $R^1$, $R^2$ include hydroxyl, carboxyl, sulfo, amino, monoalkylamino, mercapto, hydrazino, amido, arsyl, arsylene, azimino, hydrazo, imino, imido, isonitro, isonitroso, sulfino.

The monomeric acyl isothiocyanates having ethylenic alpha-beta unsaturation are prepared by the reaction of the particular acyl halide upon a finely divided, thoroughly dried metallic thiocyanate salt such as potassium thiocyanate suspended in an inert medium. The application of a little heat is advisable for expediting the reaction. The reaction mixture is preferably heated to 60–70° C. for one to two hours and the reaction brought to completion by vigorous stirring for several hours at room temperature. This technique serves to minimize the amount of polymerization the formed isothiocyanate undergoes. While benzene and dioxane provide excellent media for this reaction, other inert organic liquids such as diethyl ether, toluene, chloroform, and ethyl phenyl ether can be used. Selection of the medium should be based chiefly upon facilitating the ultimate separation of the unsaturated acyl isothiocyanate from the solvent. The lower homologues of these isothiocyanates can be distilled under reduced pressure, and therefore can be readily isolated from their respective reaction mixtures by filtering the latter and subjecting the filtrates to fractional distillation at subatmospheric pressures. It is advisable in the case of the higher undistillable homologues to choose a reaction medium of low boiling point and with little or no solvent power for the inorganic salts. The acyl isothiocyanate is then freed of the salts by filtration of its solution and of its solvent by low temperature distillation, and further purified by such techniques as molecular distillation, extraction, or fractional crystallization. Complete utilization of the acyl chloride is assured by prolonging the reaction time and by using a large excess of the metal thiocyanate.

The alpha-beta unsaturated acyl isothiocyanates of this invention react with ammonia and primary and secondary amines, i. e., with basic, ammonia-type compounds having at least one hydrogen on basic, ammonia-type nitrogen, to yield alpha-beta unsaturated acyl thioureas and with organic noncarboxylic hydroxy compounds to yield alpha-beta unsaturated acyl thiourethanes. Thus the acyl isothiocyanates of this invention may be reacted with methylamine, ethylamine, the butylamines, dimethylamine, n-dodecylamine, n-octadecylamine, aniline, the toluidines, cyclohexylamine, furfurylamine, naphthylamine, methanol, ethanol, the amyl alcohols, octadecanol, phenol, the naphthols, benzyl and furfuryl alcohols, etc.

The alpha, beta-unsaturated acyl isothiocyanates, particularly those of low molecular weight and those wherein there is a total of two hydrogens on the ethylenic bonded carbon atoms, polymerize under anhydrous conditions at room temperature or at higher temperatures. Agents such as ultraviolet light or peroxide catalysts, however, accelerate their polymerization and are particularly desirable in the case of the higher molecular weight compounds and in copolymerizations. The isothiocyanates copolymerize with vinyl and vinylidene derivatives such as methyl methacrylate and styrene under similar conditions.

The more detailed practice of the invention is illustrated by the following examples, wherein parts given are by weight. There are of course many forms of the invention other than these specific embodiments.

EXAMPLE I

ACRYLYL ISOTHIOCYANATE

To a stirred suspension of 126 parts of thoroughly dried potassium thiocyanate in 300 parts dioxane is added slowly 108 parts of acrylyl chloride. The mixture is heated to 70° C. for two hours and stirred overnight at ordinary temperature. The dioxane is filtered from the suspended solid and the solids washed with dioxane. The dioxane filtrates are combined, concentrated under 35 mm., and the residue distilled, yielding 80 parts or a 56% yield of acrylyl isothiocyanate. This compound boils at 61° C./29 mm.; $n^{25}_D$, 1.5580; $d^{25}_4$, 1.1427.

Analysis: Calculated for $C_4H_3ONS$—N, 12.28%; found—N, 14.45%.

N-ACRYLYL-N'-ALPHA-NAPHTHYL THIOUREA

Acrylyl isothiocyanate is easily converted to a crystalline derivative by reaction with α-naphthylamine. To a solution of 1.4 parts α-naphthylamine in 6 parts dry dioxane is added 1.1 parts acrylyl isothiocyanate. Heat is evolved, and the mixture becomes semi-solid on cooling to room temperature. The separated solid is recrystalized from benzene and melts sharply at 151° C. The composition of this product corresponded to that of N, N'-acrylyl α-naphthyl thiourea.

Analysis: Calculated for $C_{14}H_{12}ON_2S$—N, 10.93%; found—N, 11.00%.

EXAMPLE II

METHACRYLYL ISOTHIOCYANATE

From 194 parts potassium thiocyanate and 180 parts methacrylyl chloride, reacted under conditions similar to those disclosed in Example I, is obtained 152 parts or a 70% yield of methacrylyl isothiocyanate. This lachrymatory, thermally unstable oil boils at 74–75° C./37 mm.; $n^{25}_D$, 1.5482; $d^{25}_4$, 1.1061.

Analysis: Calculated for $C_5H_5ONS$—N, 11.03%; found—N, 11.77%.

N-METHACRYLYL-N'-ALPHA-NAPHTHYL THIOUREA

Methacrylyl isothiocyanate is readily converted to a crystalline derivative by reaction with α-naphthylamine. To a solution of 1.4 parts of α-naphthylamine in 6 parts dioxane is added 1.2 parts methacrylyl isothiocyanate. The solution is warmed on a steam bath for three minutes and cooled. The resulting solid, recrystallized from chloroform, melts at 149° C. The composition of this product corresponds to that of acrylyl α-naphthyl thiourea.

Analysis: Calculated for $C_{15}H_{14}ON_2S$—N, 10.37%; found—N, 10.46%.

N-METHACRYLYL ETHYL THIOURETHANE

Methacrylyl isothiocyanate can also be converted to a crystalline thiourethane by reaction with ethanol. A solution of 2 parts methacrylyl isothiocyanate in 10 parts of ethanol is refluxed for half an hour and let stand 24 hours. On slow evaporation of the alcohol, white crystals are deposited, which upon recrystallization from ethyl ether melt sharply at 75° C. Analysis indicates that this compound is the desired N-methacrylyl ethyl thiourethane.

Analysis: Calculated for $C_7H_{11}O_2NS$—N, 8.09%; found—N, 8.10%.

EXAMPLE III

POLYMERIZATION OF ACRYLYL ISOTHIOCYANATE

Acrylyl isothiocyanate polymerizes in a carefully dried, nitrogen filled "Pyrex" glass reactor to a hard, brittle, glass-like polymer in one week at 30° C. under ultraviolet light and in one week at 70° C. in the essential absence of ultraviolet light with and without peroxide catalyst.

EXAMPLE IV

POLYMERIZATION OF METHACRYLYL ISOTHIOCYANATE

Methacrylyl isothiocyanate polymerizes much more slowly under similar conditions. After two weeks exposure to ultraviolet light, the polymer is a jelly with monomer still present. The polymers decompose when heated at temperatures near 200° C., and are insoluble in common organic solvents, e. g., acetone, dioxane, chloroform, and xylene.

EXAMPLE V

A solution of 20 parts by volume of methacrylyl isothiocyanate in 80 parts by volume of freshly distilled styrene is exposed at 30° C. to ultraviolet light. The solution polymerizes to a non-homogeneous mass within two weeks. The polymer is characterized by a hard, red, translucent core and a white opaque shell. At 70° C. in the presence of less than 1% benzoyl peroxide, the isothiocyanate-styrene solution polymerizes to a red, clear, homogeneous mass. Copolymers with styrene containing less than 10% of methacrylyl isothiocyanate are homogeneous. The following table indicates the results of a number of such copolymerizations in which the concentration of methacrylyl isothiocyanate in styrene is varied from 0 to 10%. S is the softening point of the polymer and H the hardness, as determined on a Pfund instrument which measures the weight required to force a quartz ball a given depth into the surface of the polymer. The comparisons indicated were made after the samples had been exposed for three weeks to ultraviolet light.

Table

|  | Methacrylyl isothiocyanate | | | |
|---|---|---|---|---|
|  | 0% | 2% | 5% | 10% |
|  | °C. | °C. | °C. | °C. |
| Styrene ultraviolet light— | | | | |
| S | 76 | 103 | 101 | 100 |
| H | 85 | 380 | 320 | ----- |
| Ultraviolet light with peroxide— | | | | |
| S | 99 | 102 | 110 | 111 |
| H | 300 | 340 | 400 | ----- |

EXAMPLE VI

A solution of 20 parts by volume of methacrylyl isothiocyanate in 80 parts by volume of freshly distilled methyl methacrylate is exposed at 30° C. to ultraviolet light. The solution polymerizes to a non-homogeneous mass within two weeks. The polymer is characterized by a hard, red, translucent core and a white opaque shell. At 70° C. in the presence of less than 1% benzoyl peroxide, the isothiocyanate-styrene solution polymerizes to a red, clear, homogeneous mass. Copolymers with methyl methacrylate containing less than 10% of methacrylyl isothiocyanate are homogeneous.

EXAMPLE VII

At 30° C. under ultraviolet light a solution of 2 parts acrylyl isothiocyanate in 5 parts by volume of freshly distilled styrene or freshly distilled methyl methacrylate polymers in two weeks to a non-homogeneous hard mass consisting of a red, clear hard core and a white, thin jacket. At 70° C., with and without benzoyl peroxide catalyst (<1%), the styrene solutions containing 2 parts of acrylyl isothiocyanate polymerize to clear, resinous masses. Under similar conditions methyl methacrylate solutions containing 2 parts of the isothiocyanate polymerize to hard polymers which, however, are not entirely homogeneous. Compositions having less than 10% of the acyl isothiocyanate interpolymerize to clear hard polymers.

The alpha, beta-unsaturated acyl isothiocyanates of this invention are represented by the structure $RR'C=C(R'')CO(NCS)$ in which R, R', R'' are monovalent substituent groups; these groups can be hydrogen, halogen, hydrocarbon residues, heterocyclic and alkoxy radicals, saturated or unsaturated, and in general any organic radical that possesses no embodied or substituted group or groups capable of reaction with the isocyanate group, and more particularly containing no reactive hydrogen atom. In the general formula R—CO—NCS, the group R—CO— may be, for example, the radical of the following acids: crotonic, angelic, tiglic, vinylacrylic, sorbic, geranic, alpha- and beta-chloroacrylic, alpha- and beta-chlorocrotonic, furylacrylic, alpha-ethoxyacrylic, cinnamic, alpha-phenyl acrylic, etc.

In the preparation of the isothiocyanate, any monomeric alpha, beta-unsaturated acyl halide of the formula

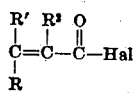

wherein Hal represents any halogen and R, R' and R² are as above may be employed. The acyl chlorides are most convenient, but the bromides and fluorides can be used. The iodides are least satisfactory because of the difficulty of their preparation and their poor stability. Exemplary halides are the acid chlorides of acrylic, methacrylic, crotonic, vinylacrylic, sorbic, α-chloroacrylic, tiglic, furylacrylic, cinnamic, and alpha-phenylacrylic acids. Of these the most available and the preferred acid halides are the unsubstituted lower aliphatic alpha-beta unsaturated acid halides.

Similarly any metal thiocyanate may be employed including potassium, sodium, lithium, silver, barium, calcium, mercuric and magnesium thiocyanates.

The medium employed in effecting the reaction can be any organic liquid indifferent to the substances involved in the reaction and boiling at any temperature between room temperature and 250° C. Generally, a liquid is chosen which boils within the more limited range of 60° to 120° C. and which acts as a solvent for the acyl isothiocyanates but not for the inorganic salts. This facilitates the purification of the isothiocyanate whether it is or is not readily distillable. No limitation is placed upon the method chosen for the isolation of the isothiocyanate since this will depend upon the particular isothiocyanate prepared and the agents used for its preparation. However, the distillation of the lower homologous unsaturated acyl isothiocyanates affords a convenient method for their isolation and purification. The reaction mixture is preferably kept dry, and stirring is advisable. The temperature at which the reaction is carried out and its duration are not only interdependent, but are dependent upon the particular acyl isothiocyanate and thiocyanate salt used. Generally speaking, the reaction does not require a temperature higher than 100° C. and a time greater than 24 hours. The reaction can be carried out at low temperatures, i. e., 0° C. or lower, but the reaction rate is inconveniently slow at such low temperatures.

The polymerization, including copolymerization, of the alpha, beta-unsaturated acyl isothiocyanates of the present invention can be effected in bulk at any temperature below decomposition temperatures using any stable organic peroxide as catalyst, in closed or open containers, providing that the open containers do not permit loss of the more volatile compounds or the ingress of moisture, and at subatmospheric, atmospheric, or superatmospheric pressures. The polymerizations and copolymerizations can also be carried out by emulsifying the monomeric materials in appropriate media.

The alpha, beta-unsaturated acyl isothiocyanates may be copolymerized with any polymerizable organic compounds containing a methylene ($CH_2$) group united by means of an ethylenic double bond to a carbon which is in turn attached to a negative group, as more fully explained in Chapter 8 of Henrich, Johnson & Hahn—Theories of Organic Chemistry. Examples of such polymerizable $CH_2=C$ compounds are vinyl acetate, methyl methacrylate, unsymmetrical dichloroethylene, vinyl chloride, vinyl bromide, methyl alpha-chloroacrylate, butadiene, and chloroprene.

The monomers are useful as intermediates in the preparation of thioureas, thiourethanes and of polymers and copolymers. Polymers containing reactive hydrogen atoms such as cellulose acetate, glyptals, urea-formaldehyde, and phenol-formaldehyde resins may have such properties as softening point and solubility modified by reaction with the acyl isothiocyanates. The polymers and copolymers are of use in the preparation of cast articles. Those with styrene are particularly preferred. The copolymers are also useful as agents for imparting a water-repellent finish to fabrics.

The term "homopolymer" is used to indicate the product obtained by polymerizing an acyl isothiocyanate in the essential absence of any other polymerizable ingredient.

In the claims the term "copolymer" is used to indicate the product obtained by polymerizing together an acyl isothiocyanate and at least one other polymerizable ingredient as defined above, or a mixture of two or more acyl isothiocyanates.

The above description and examples are intended to be illustrative only. Any modification of or variation therefrom which conforms to the spirit of the invention is intended to be included within the scope of the claims.

What is claimed is:

1. An acyl isothiocyanate having an ethylenic double bond between the carbons alpha and beta to the —CO—NCS group and free from active hydrogen containing groups.

2. An aliphatic acyl isothiocyanate having an ethylenic double bond between the carbons alpha and beta to the —CO—NCS group.

3. A polymer of an acyl isothiocyanate having an ethylenic double bond between the carbons alpha and beta to the —CO—NCS group and free from active hydrogen containing groups.

4. A polymer of an aliphatic acyl isothiocyanate having an ethylenic double bond between the carbons alpha and beta to the —CO—NCS group.

5. A copolymer of an acyl isothiocyanate having an ethylenic double bond between the carbons alpha and beta to the —CO—NCS group and free from active hydrogen containing groups with a polymerizable organic compound containing the methylene ($CH_2$) group attached by an ethylenic double bond to a carbon in turn attached to a negative group.

6. A copolymer of an aliphatic acyl isothiocyanate having an ethylenic double bond between the carbons alpha and beta to the —CO—NCS group with a polymerizable organic compound containing the methylene ($CH_2$) group attached by an ethylenic double bond to a carbon in turn attached to a negative group.

7. A copolymer of styrene with an acyl isothiocyanate having an ethylenic double bond between the carbons alpha and beta to the —CO—NCS group and free from active hydrogen containing groups.

8. A copolymer of styrene with an aliphatic acyl isothiocyanate having an ethylenic double bond between the carbons alpha and beta to the —CO—NCS group.

9. A copolymer of styrene with methacrylyl isothiocyanate.

10. A copolymer of styrene with up to 10% methacrylyl isothiocyanate.

VAN VERNON ALDERMAN.
DONALD DRAKE COFFMAN.